Aug. 14, 1962    E. L. KALLANDER ETAL    3,049,463
DECORATED FOAM AND METHOD OF MAKING THE SAME
Filed Sept. 9, 1959

INVENTORS
Ernest L. Kallander
George R. Nelson
by Roberts, Cushman + Grover
ATT'YS

United States Patent Office 3,049,463
Patented Aug. 14, 1962

3,049,463
DECORATED FOAM AND METHOD OF
MAKING THE SAME
Ernest L. Kallander, Southboro, and George R. Nelson, Framingham, Mass., assignors to Dennison Manufacturing Company, Framingham, Mass., a corporation of Massachusetts
Filed Sept. 9, 1959, Ser. No. 839,004
7 Claims. (Cl. 156—230)

This invention relates to decorated foamed plastic and more particularly to a method of providing firmly bonded ink decoration to foam during manufacture, and the product resulting therefrom.

The principal object of the present invention is to provide a novel method of decorating foam plastic, and particularly polyurethane foam. Further objects include the provision of a method of decorating foam which is simple and inexpensive, which is attractive, and which provides decoration more firmly bonded to the foam than methods heretofore employed. Other and further objects will be apparent from the following description.

In one aspect, the present invention involves a method of decorating plastic foam which comprises forming said foam in contact with a release sheet having on its inner surface ink which adheres more strongly to the foam than to the release sheet. Preferably, as hereafter disclosed, the foam is polyurethane and the ink comprises a resinous binder which reacts with the polyurethane during foaming thereof to form a chemical bond thereto.

In a more particular aspect, the present invention involves a method of forming a decorated foam layer by mixing materials which together produce foam, which method comprises feeding two cover sheets along paths which converge to form therebetween a crotch terminating in a metering slit and thence continue in approximate parallelism to a foaming region, one of said cover sheets comprising a release sheet printed with ink, mixing said materials and feeding the mixture through said crotch and slit so that the mixture is metered before substantial foaming takes place, said ink adhering more strongly to the foam layer than to the release sheet whereby the ink transfers to the foam layer when said release sheet is stripped free. Preferably, one of said cover sheets is free to move away from the other sheet in said region so that the foaming does not build up substantial pressure in the layer of foam.

Figure 1:
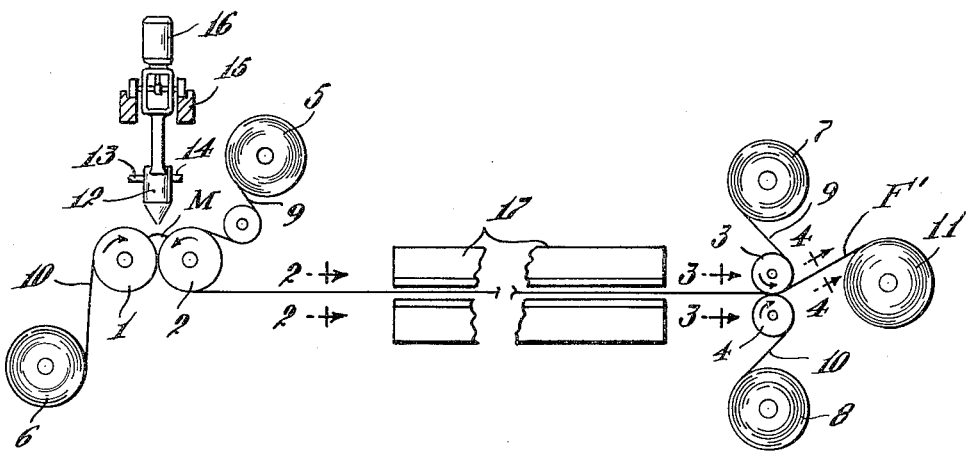
Figures 2, 3:
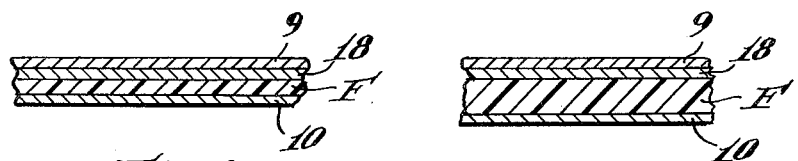
Figure 4:

This invention is illustrated in the accompanying drawing in which:

FIG. 1 is a side view illustrating one embodiment of the method and apparatus diagrammatically;
FIG. 2 is a section on the line 2—2 of FIG. 1;
FIG. 3 is a section on the line 3—3 of FIG. 1; and
FIG. 4 is a section on the line 4—4 of FIG. 1.

Referring to FIG. 1, the apparatus illustrated comprises two metering rolls 1 and 2 spaced horizontally in close juxtaposition to form a crotch therebetween, and two feed rolls 3 and 4 at the other end of the apparatus, the rolls turning in the direction of the arrows. Feeding between these rolls from supply reels 5 and 6 to take-up reels 7 and 8 are two cover sheets 9 and 10. A third take-up reel 11 winds up the finished sheet of decorated foam F'. Foam material M is fed into the aforesaid crotch by a mixing chamber 12 having inlets 13 and 14 for the catalyst and resin respectively, the mixing chamber being moved back and forth lengthwise of the crotch along a track 15 by a motor 16 through a suitable mechanism of well-known construction. Thus the mixture M is distributed uniformly along the track and feeds between the metering rolls before the mixture begins to foam substantially. Then the mixture is carried between sheets 9 and 10 to heater 17 where foaming and the curing takes place, the foam sheet F being completely cured before reaching the feed rolls 3 and 4 where the cover sheets are peeled off and wound separately.

According to this invention, one of the cover sheets 9 and 10 comprises a release sheet having on the face thereof adjacent the foam material M a transferable ink 18 which adheres to the cured foam layer F more strongly than to the release sheet. Suitable release sheets and ink composition will be hereinafter described.

The plastic material M comprises a foamable resinous mixture. While other plastics, including elastomers, can be used, polyurethane is preferred, Examples 1 and 2 below being typical:

Example 1

An isocyanate terminated polyester prepared by the reaction of a polyester resin (the reaction product of diethylene glycol with adipic acid and a triol) with toluene diisocyanate (commercially available as Nopcofoam Sx59R) having an isocyanate content of 11½% is continuously mixed in the proportion of 1 part resin to .065 part of a catalyst mixture prepared by mixing 1.25 parts of N Methylmorpholine, 0.25 part triethylene diamine, 2.00 parts water, and 1.5 parts of a water in oil emulsifier (commercially available as Witco 77–86). The amount of water corresponds to 124% theoretical or 24% excess water. The cream time of mix is about 5 seconds. The combined formulation is delivered continuously into the nip of the metering rolls and taken away between two sheets of a suitable releasing sheet at a rate such that no build-up of foamable material occurs in the nip. Using the above formula the resin mixture should be delivered at a rate of about 2.43 pounds per minute. Under the particular conditions of this example the resin temperature at time of delivery to mixer housing should be less than 77° F. to avoid premature reaction and production of foam in the nip. The nip clearance of the metering rolls between the two sheets of releasing paper may be adjusted to about .008 inch. Under these conditions the speed of the paper should be about 15 feet per minute. The foamable mix is allowed to foam between the two sheets at 75° F. for two minutes, then heated to 250° F. for one minute to obtain a cure of the foam sufficient to permit handling of the foamed sheet. Density of the foam is 2.6 pounds per cubic foot.

Example 2

An isocyanate adduct of a polypropylene glycol with toluene diisocyanate having an isocyanate content of 10.5% (Nopcofoam 3073) is mixed continuously in the proportion of one part resin to 0.060 part of a catalyst mixture prepared by mixing 1.5 parts N Methylmorpholine, 0.5 part triethylene diamine, 2.4 parts water, 1.2 parts of a 30% water emulsion of a silicone resin (Union Carbide's Silicone Emulsion XLE 452). The amount of water corresponds to 115% theoretical or 15% in excess. The cream time of the mix is 11 seconds. The foamable mix is foamed according to Example 1 with the exception that foaming is carried out at elevated temperatures. The top surface is exposed to a temperature of 200° F. and the bottom surface to 150° F. After 1½ minutes the foam is subjected to a temperature of 250° F. for two minutes until cured sufficiently to be handled. Density of the foam is about 2.0 pounds per cubic foot.

Cream times are given since this determines the maximum length of time the foamable mix can remain in the trough of the metering rolls. In general a cream time of five seconds is the minimum, it being preferred to have a cream time of ten seconds. By cream time is meant the time required for the foamable mix to show the first evidence of foaming. This shows up generally by the resin changing from translucent to opaque.

Ink decoration for application to the release sheet must be an ink which adheres more strongly to the cured foam than to the release sheet. Where the foam comprises polyurethane, formulations are preferred which embody a resinous binder which contains reactive hydrogen which will react with the isocyanates of the polyurethane foam during the foaming thereof together with other components such as pigments or dyes, plasticizers, fillers or solvents. Examples of reactive binders include cellulose derivatives such as ethyl cellulose, nitrocellulose, cellulose acetate, and cellulose acetate butyrate; vinyl compounds such as polyvinyl alcohol and vinyl acetate copolymers; phenolics; polyamide resins such as the condensation products of a dicarboxylic acid with an alkyl, aryl, or alicyclic diamine, for example nylon formed by condensing adipic acid with ethylene diamine; polyurethanes; melamine formaldehyde; urea formaldehydes; and polymeric carboxylic acids such as the copolymers of vinyl acetate with malic acid, and polyacrylic acid.

In addition to resinous or polymeric binders which react chemically, highly polar resins or polymers are strongly attached to polar polyurethane foam such as they too cannot be removed by ordinary means without destroying the foam. Examples of such polar materials include chlorosulfonated polyethylenes, acrylonitrile rubbers, cyclized rubbers, isoprene rubbers, chloroisoprene rubbers, and polystyrene butadiene rubbers.

Examples of the foregoing ink compositions are given below as Examples 3–5, Examples 3 and 4 being based on the reactive binders, while Example 5 is a polar binder as above described, all proportions being by weight:

*Example 3*

| | |
|---|---|
| Cellulose acetate butyrate (½ second) | 15 |
| Dibutyl phthalate | 7.5 |
| Titanium dioxide | 10 |
| Clay | 35 |
| Solvent | 40 |

*Example 4*

| | |
|---|---|
| Polyamide resin 930 (General Mills) | 15 |
| Titanium dioxide | 10 |
| Clay | 35 |
| Solvent | 40 |

*Example 5*

| | |
|---|---|
| Chlorosulfonated polyethylene (Hypalon 20 of the Du Pont Co.) | 15 |
| Pigment | 45 |
| Solvent | 40 |

The inks described above are applied to a self-supporting release sheet by any of the conventional methods such as gravure, letter press, printing machines, or as overall coats obtained by coating the support with knife coaters, roll coaters, Mayer machines, and hot melt machines. The release sheet carrying the ink decoration must release the ink under conditions of use and must be non-reactive with the foaming resin mixture. For use with most foam materials, including polyurethane, non-reactive smooth films such as polyethylene or polytetrafluoroethylene can be used without further treatment, or self-supporting films such as paper, cellulose acetate, polyethylene terephthalate, cellophane, polyvinyl chloride, polyaryl carbonates, or the like, can be used if suitably coated prior to printing and transfer. Suitable release coatings for these latter sheets include any wax-like material which does not contain reactive groups capable of reacting with the foaming resin components, such as isocyanate. Such coatings include paraffin wax, fluorinated waxes such as "Kel F" of the M. W. Kellogg Co., polyethylene coatings, and silicone resins such as Dow Corning Corp. DC–23. These coatings can be applied to the release sheet in the preferred The above described inks are applied to the release coating weights of from ½ to ¾ pounds per ream (20 x 25—500).

sheet, dried, brought into contact with the foam mixture prior to foaming, maintained in contact during foaming, and thereafter stripped free to leave the ink firmly bonded to the cured foam.

The release sheet preferably should strip from the decorated foam with a release force, as hereinafter described, less than 40 grams and preferably from 2–4 grams. The release force is measured by adhering a one-inch foam strip, release sheet up, to a glass plate, partially stripping a portion of the release sheet to expose a free end, placing the plate in a balance pan, connecting the free end of the release sheet to a pulley device which will strip the sheet vertically at a uniform rate, and stripping the release sheet while maintaining the balance; the difference in weight of the plate before and during stripping being termed the release.

While any of the samples given above can be combined to give a useful decorative foam according to this invention, one preferred procedure is as follows. A polyurethane foam is mixed and processed in accordance with Example 2, the mixed ingredients being fed into the nip of metering rolls 1 and 2 between release sheets 9 and 10 which comprise paper having on the foam-contacting side a silicon release coating. The sheets 9 and 10 are fed by the metering rolls with a sufficient velocity to remove deposited mix in less than 11 seconds. One or both of the released sheets 9 and 10, prior to being fed through the nip of rolls 1 and 2, is provided on the release side with an ink design of the formulation given in Example 5. This ink is a preferred formulation since the resinous binder has a flexibility approximating that of the polyurethane foam which minimizes the formation of wrinkles on the foam surface. After the foam is cured as specified in Example 2, the released sheets are stripped away, the ink being transferred to the foam and being intimately bonded thereto.

It should be noted that this invention is characterized by application of the ink to the foam prior to the completion of foaming. By this means better bonds are obtained without necessity for heat or pressure, very firm bonding of the ink being obtained even though applied to the incipient foam at 70–75° F. and in the absence of any appreciable pressure. As a further advantage, the ink decoration is printed readily to paper or the like rather than to the thicker, resilient foam.

It should be understood that the foregoing description is for the purpose of illustration only and that the invention includes all modifications falling within the scope of the appended claims.

We claim:

1. The method of decorating plastic foam which comprises printing an adhesive, non-self-supporting ink design onto a flexible release sheet, drying the ink, applying an uncured, foamable plastic mixture to said design, foaming and solidifying said plastic between said design and a second cover sheet, the foam being in contact with the design during formation of the foam, and transferring said ink design to the foam by stripping away said release sheet, the ink adhering more strongly to the foam than to the release sheet.

2. The method according to claim 1 wherein said foam is polyurethane.

3. The method according to claim 2 wherein said ink comprises a resinous or polymeric binder which reacts with said foam during foaming to form a chemical bond thereto.

4. The method according to claim 2 wherein said ink comprises a polar binder having a flexibility substantially similar to the foam.

5. The method according to claim 1 wherein said ink design is discontinuously applied to said release sheet so as to be permeable to air.

6. The method according to claim 1 wherein said foam is polyurethane and wherein said ink design has a flexibility substantially as great as the foam.

7. A decorated foam sheet made according to claim 1 characterized by a thin, smooth, microporous skin carrying fine ink decoration, said decorated foam surface being air-permeable, said ink having a flexibility substantially as great as the foam.

References Cited in the file of this patent
UNITED STATES PATENTS

| | | |
|---|---|---|
| 1,496,753 | Burkley | June 3, 1924 |
| 2,841,205 | Bird | July 1, 1958 |
| 2,845,997 | Waite | Aug. 5, 1958 |
| 2,866,730 | Potchen et al. | Dec. 30, 1958 |
| 2,872,965 | Sisson | Feb. 10, 1959 |
| 2,956,310 | Roop et al. | Oct. 18, 1960 |